United States Patent

[11] 3,589,531

| | | |
|---|---|---|
| [72] | Inventor | Lawrence J. Povlacs<br>Dothan, Ala. |
| [21] | Appl. No. | 818,682 |
| [22] | Filed | Apr. 23, 1969 |
| [45] | Patented | June 29, 1971 |
| [73] | Assignee | Akwell Industries, Incorporated<br>Dothan, Ala. |

[54] BALLOON COUNTER
11 Claims, 5 Drawing Figs.

[52] U.S. Cl............................................. 214/1 C,
198/40, 214/152, 221/211, 235/123, 198/210
[51] Int. Cl............................................... G06m 7/00
[50] Field of Search............................................ 214/1 C,
152; 198/40; 221/211; 235/123

[56] References Cited
UNITED STATES PATENTS

| 792,918 | 6/1905 | Ohlendorf et al............. | 214/1 C UX |
| 2,324,823 | 7/1943 | Chilson et al................. | 221/211 X |
| 2,505,758 | 5/1950 | Enebeck........................ | 221/211 X |
| 3,204,750 | 9/1965 | Tarzian ........................ | 221/211 X |
| 3,434,437 | 3/1969 | Mark et al. ................... | 221/211 X |

Primary Examiner—Gerald M. Forlenza
Assistant Examiner—Frank E. Werner
Attorney—McNenny, Farrington, Pearne & Gordon ABSTRACT: A method and apparatus for counting articles are disclosed which utilize a cylindrical drum radially divided into several individual sections or counters. Each individual counter includes at least one vacuum manifold extending axially along the outer surface of the drum. Each manifold is provided with at least one nozzle which extends to the inner surface of the drum and which is operable to pick up articles when its associated manifold is vacuum actuated. As one of the counters rotates through a zone in which the articles to be counted lie, some of its manifolds are actuated with a vacuum so that their associated nozzles pick up a preselected number of articles. Continued rotation of the drum rotates the counter to a zone wherein each of the actuated manifolds is supplied with air pressure to release the predetermined number of articles so that they fall on a conveyor belt which carries them to a receptacle. By actuating different combinations of manifolds of each counter, each counter is able to transfer any one of several predetermined numbers of articles.

PATENTED JUN29 1971 3,589,531

INVENTOR
LAWRENCE J. POVLACS
BY
McNENNY, FARRINGTON,
PEARNE & GORDON

ATTORNEYS 3,589,531

1

BALLOON COUNTER

BACKGROUND OF THE INVENTION

This invention relates generally to article transfer machines and, more particularly, to a machine for transferring predetermined numbers or counts of articles to an accumulator device. Still more particularly, the invention relates to machines of the type referred to which are capable of receiving articles in bulk, without requiring that the articles be arranged or sorted in any particular relative positions, and delivering at predetermined time intervals any desired number of articles from the bulk supply to an accumulator.

The types of articles to be delivered to the accumulator, and for which the present invention has been particularly adapted, are thin-walled articles of rubber, latex, or the like, such as rubber balloons, prophylactic devices, and devices of a similar character which, by virtue of their soft textures and irregular shapes, are unsuited for most types of mechanical delivery from a bulk supply bin to a receptacle.

The present invention has been especially adapted to supply preselected counts of articles to a packaging machine which is operable to package a wide range of numbers of articles. However, it is suitable for feeding articles to a wide variety of machines in which any of numerous operations may be performed upon the articles, such as a subsequent manufacturing operation or an inspection operation.

Prior art article-feeding machines capable of handling bulk articles of the type described above include the machine disclosed in U.S. Pat. No. 3,253,719. Although machines of this type have been quite satisfactory in operation, they are, nevertheless, subject to certain inherent limitations including being rather complicated, being adapted to transfer only relatively small numbers of articles, and being unable to transfer a wide range of numbers of articles.

Still another prior art article transfer machine for transferring bulk articles of the above description includes a foraminous drum rotatably mounted about a horizontal axis and partially filled with articles. A suction hood is disposed adjacent an external portion of the drum and provides a substantially constant vacuum to its adjacent foramina. As the drum rotates, articles are held against the side of the drum by the vacuum and are subsequently discharged onto a conveyor belt as they pass out of the suction zone. Although such a machine can transfer bulk articles of the nature described without damaging them, it cannot control the exact number of articles transferred.

SUMMARY OF THE INVENTION

According to the teachings of this invention, a method and apparatus are provided for receiving randomly disposed bulk articles and for transferring preselected counts of those articles to an accumulator means at desired intervals of time. The invention provides for the substantially continuous pickup and discharge of articles so that the accumulator means may receive subsequent counts without substantial delay. The invention further provides a means to preselect the number of articles contained in each count over a wide range of numbers and in small increments so that the machine may be used to supply counts having various numbers of articles to a packaging machine.

In a specific embodiment, the invention utilizes a drum rotatably mounted about a horizontal axis to transfer counts of randomly disposed bulk articles within the drum to a conveyor means which extends into the drum and carries each count to a receptacle outside of the drum. The drum is circumferentially divided into several sections, each of which may be considered an individual article counter means. Each of these counter means includes several manifolds extending axially along the external periphery of the drum. The manifolds are provided with various numbers of vacuum nozzles extending through the drum to the inner surface thereof so that when a vacuum is applied to one of the manifolds, each nozzle associated with that manifold picks up one of the bulk articles within the drum. Axially adjacent nozzles are separated by separator plates so that the nozzles may be spaced relatively close together and yet two axially adjacent nozzles will not pick up the same article to give an inaccurate count.

As the drum rotates, each section or article counter means passes from the zone in which the bulk articles lie, which may be called the article-receiving zone, to a zone above the conveyor belt, which may be called the article discharge zone. As each counter rotates through the receiving zone, vacuum is supplied to preselected manifolds so that a preselected number of articles will be picked up by the counter. By varying the particular manifolds of each counter to which the vacuum is supplied, as well as by varying the total number of manifolds actuated, the number of articles to be transferred by each counter may be selected over a wide range. As the counter rotates out of the article-receiving zone and before it reaches the article discharge zone, a blast of air is supplied through perforations in the drum adjacent the nozzles to remove any excess articles that might have been picked up. As the counter reaches the article discharge zone, the vacuum is released and the formerly actuated manifolds are supplied with a burst of air pressure to dislodge the entire count onto the conveyor belt which carries the count to the receptacle.

Since the entire article transfer operation is effected without the use of any mechanical actuators, the articles are not pinched or torn or otherwise damaged during the counting operation. Furthermore, by utilizing manifolds having different numbers of pickup nozzles, the number of articles in each count may be varied over a wide range at rather small intervals. Still further, the use of a rotating drum permits a continuous operation wherein subsequent counts of articles are supplied to the accumulator without a substantial delay.

The foregoing and other features and advantages of the invention will be better understood and more fully appreciated from the following detailed description of a presently preferred embodiment of the invention, and from the accompanying drawings thereof to which the description refers.

DESCRIPTION OF THE PREFERRED EMBODIMENT

Figure 1:
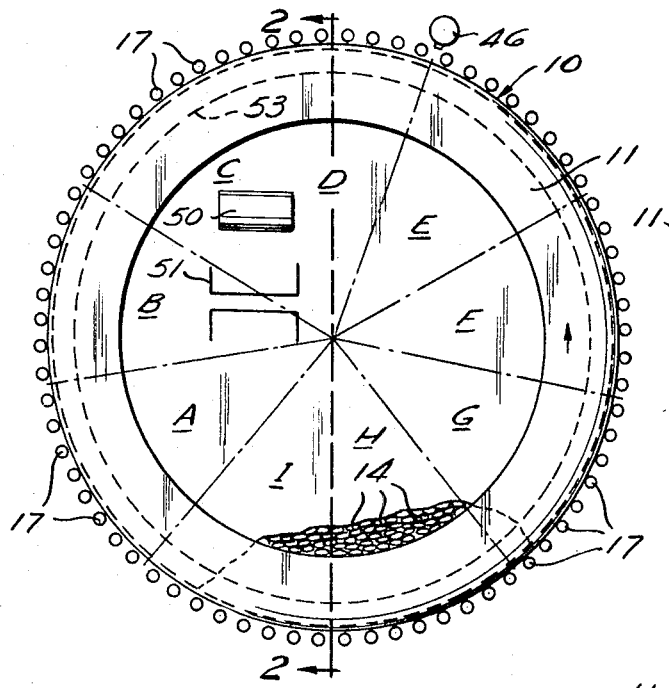
FIG. 1 is an elevational view of a presently preferred article-counting machine according to the principles of this invention.
Figure 3:
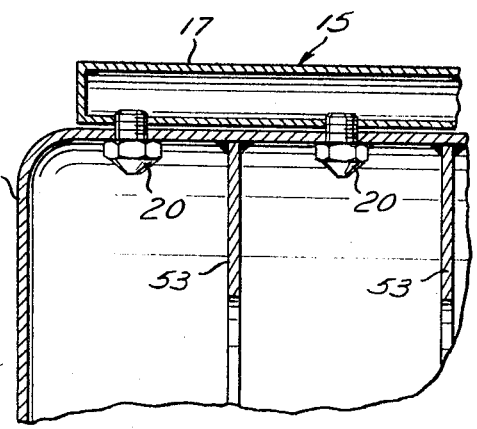
FIG. 3 is an enlarged, cross-sectional, fragmentary view of a portion of the drum showing one of the manifolds and two of its associated nozzles.

Referring to the drawings in greater detail, reference numeral 10 designates generally an article transfer assembly which is shown schematically and which includes a vehicle for moving a counter means between a zone in which it operates to pick up articles and a zone in which it operates to discharge articles. In the embodiment shown, this vehicle is a cylindrical drum 11 rotatably disposed about a horizontal axis. The drum 11 is preferably of a heavy gauge sheet metal, but may be of any suitable material, including, for example, a suitable wire mesh or the like. An adequate power means, such as the electric motor 12, is provided to rotate the drum by means of drive belt 13, and to provide power for other purposes set forth in greater detail hereinafter. The drum 11 is partially filled with randomly disposed bulk articles 14, such as thin-walled articles of rubber, latex, or the like, which are to be transferred in preselected counts to a packaging machine or other work station. The articles 14 may be supplied to the drum 11 directly from a prior manufacturing operation or from a storage bin in which they have been accumulated.

In order to understand the operation of the disclosed apparatus, the drum 11 may be considered as being circumferentially divided into several sections, each of which comprises an individual article counter means, so that, in effect, the transfer assembly 10 comprises a plurality of individual counters spaced about the circumference of the drum. The number of sections into which the drum is divided is determined by the particular use for which the assembly is intended, and in the preferred embodiment the drum is divided into nine sections or counter means designated by reference letters A through I.

Each of the nine individual counters A through I is operable to sequentially transfer a preselected number or count of the bulk articles 14 to an accumulator means at timed intervals. For this purpose each counter is provided with a plurality of vacuum-actuated article pickup means designated generally by reference numeral 15. Each article pickup means 15 includes a manifold 17 extending axially along the external surface of the drum and a plurality of individual nozzles or fingers 20 associated with the manifold and projecting through the drum to the interior surface thereof to effect the actual engagement and transfer of the articles.

Each counter A through I may have any desired number of manifolds 17, depending upon the particular use for which the machine is intended, but, for purposes of simplicity, all of the counters preferably have the same number of manifolds. In the preferred embodiment, each of the counters is shown to have eight manifolds. Furthermore, it is preferred that at least some of the manifolds in each counter have a different number of nozzles from other manifolds in that same counter so that each counter can pick up a wide range of numbers of articles with a relatively small increment between numbers in the range, as will become more apparent in the discussion of the operation of the machine. In each counter in the preferred embodiment, two of the manifolds have 10 nozzles, two of the manifolds have 11 nozzles, and four of the manifolds have 13 nozzles. Again, for purposes of simplicity, it is preferred that correspondingly positioned manifolds in the nine counters have the same number of nozzles. In the preferred embodiment, the two leading manifolds of each counter means have 10 nozzles the next two manifolds have 11 nozzles each, and the last four manifolds have 13 nozzles each.

It is again emphasized that the selection of the exact number of counters, the exact number of manifolds in each counter, and the exact number of nozzles associated with each manifold in the particular embodiment described is based upon the particular intended use of the article transfer machine. For other uses of the machine, for example, it may even be desirable to have just one counter with several article pickup means 15, or several counters each having only one article pickup means.

As the drum 11 is rotated, each counter A through I passes through the zone in which the bulk articles 14 lie, which may be called the article-receiving zone. Since each nozzle 20 extends to the inner surface of the drum 11, each of the nozzles associated with any one of the manifolds 17 will pick up one of the randomly disposed bulk articles within the drum when that manifold is in the article-receiving zone and is supplied with a vacuum. Furthermore, it is apparent that each of the nozzles associated with any one of the manifolds will discharge its article when the vacuum is released from that manifold, and/or when a blast of air is supplied to the manifold. For this purpose, the article transfer assembly is provided with a valve means indicated generally by reference numeral 22.

Figure 5:
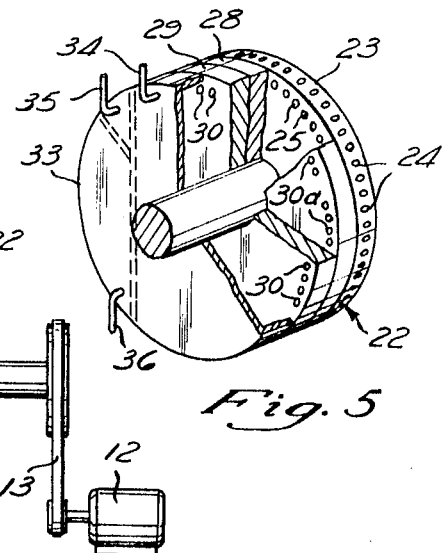
FIG. 5 is an enlarged, perspective view of a rotary valve that may be used in the presently preferred article counting machine of FIG. 1.

The valve means 22, as best seen in FIG. 5, includes a distributor plate 23 which supplies the vacuum or pressure to each of the manifolds 17 by virtue of the bores 24 which extend radially inward toward the center of the plate 23 and communicate with corresponding bores 25 extending inwardly from the radial end face of the plate 25 extending inwardly from the radial end face of the plate 23. Two selector plates 28 and 29 are provided to selectively expose certain of the bores 25 and their associated manifolds 17 to vacuum or pressure sources. The selector plate 29 is provided with nine groups of bores 30 with four bores 30 in each group. The selector plate 28 is similar to the plate 29 and is provided with nine groups of bores 30a with four bores 30a in each group. The arcuate extent of and the arcuate spacing between each group of bores 30 and 30a is the same as the arcuate extent of four of the bores 25 in the plate 23.

As shown in FIG. 5, the plates 28 and 29 are positioned so that their bores 30 and 30a are out of alignment. However, by rotating the plates 28 and 29 with respect to one another, each of the bores 30 may be aligned to uncover one, two, three, or four of the bores 30a in each group of bores. After a desired one or more of the bores 30a in each group of bores has been uncovered in this manner, the uncovered bores 30a are aligned with a preselected group of bores 25 in the plate 23. By rotating the selector plates 28 and 29 in this manner with respect to each other and with respect to the distributor plate 23, the bores 25, and hence the manifolds 17 in each of the nine counter means A through I that are to be actuated, are selected. Once this selection has been made, the separator plates 28 and 29 are locked in position to rotate with the distributor plate 23 and the drum 11.

The valve means 22 also includes a stationary cover plate 33 which supplies vacuum to the selected manifolds as they rotate through the article-receiving zone to the article discharge zone, and a blast of air to the selected manifolds at the article discharge zone. For this purpose, the stationary cover plate 33 is divided into three chambers, including a vacuum chamber connected to a source of vacuum by the line 34, a pressure chamber supplied with air pressure by the line 35, and a release chamber vented to the atmosphere by line 36. As the drum rotates the bores 30 and their aligned bores 30a communicate with the vacuum chamber as their corresponding manifolds rotate from the article-receiving zone to the article discharge zone, and the bores 30 subsequently pass through the pressure chamber to supply a blast of air to the actuated manifolds as they pass through the article discharge zone.

By varying the manifolds to which vacuum is supplied, the number of articles in the count that will be transferred by that particular counter is changed. In the specific embodiment illustrated, the valve means 22 is operable to supply vacuum to zero, one, two, three, or four of the manifolds in each counter. If each manifold of each counter had the same number of nozzles, then the range of numbers of articles that could be picked up by each counter would be in numerical increments equal to the number of nozzles associated with each counter. However, in the preferred embodiment, the number of nozzles associated with each manifold is not constant, so that each counter is operable to pick counts of articles at increments numerically smaller than the smallest number of nozzles associated with any one manifold. In the preferred embodiment, for example, although each manifold has 10 or more nozzles, each individual counter means can transfer counts of articles ranging from 10 to 52 articles at increments smaller than 10.

Figure 4:
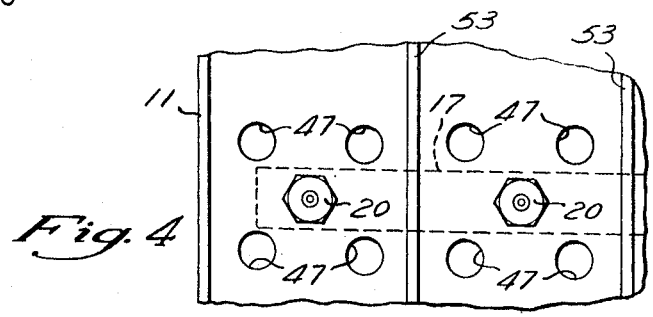
FIG. 4 is an enlarged, fragmentary view of a portion of the inner surface of the drum, showing two of the nozzles projecting through the drum and the airholes associated with each of the nozzles.
Figure 2:
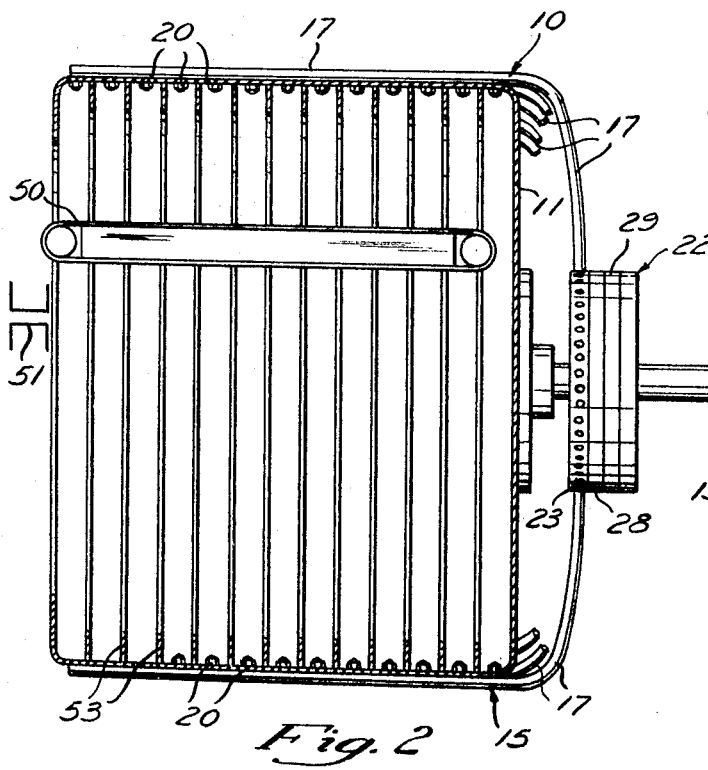
FIG. 2 is a cross-sectional view, the plane of the section being indicated by the line 2-2 in FIG. 1, but with the articles removed for clarity.

In actual operation of the transfer assembly 10, the drum 11 is rotated by the electric motor 12 in a counterclockwise direction, as viewed in FIG. 1. After each article counter means has passed through the article-receiving zone and has picked up its preselected count of articles as described above, continued rotation of the drum causes the loaded counter to pass beneath a stationary blower means 46 which extends axially along the outer surface of the drum to provide a continuous light blast of air to the outer surface of the drum as the drum rotates. As best seen in FIG. 4, each nozzle 20 is surrounded by a plurality of perforations 47 so that when each nozzle 20 passes beneath the blower means 46, any excess articles that have been picked up by the counter will be discharged before the counter means reaches the zone in which its preselected count is to be discharged. This excess article removal means ensures that each counter will pick up no more than the number of articles that has been preselected by the valve means 22.

Continued rotation of the drum 11 moves each of the article counters through the article discharge zone, which may be defined as the zone in which the articles are released. To ensure timely discharge of each article in the discharge zone, the valve 22 releases the vacuum on the actuated manifolds and supplies those manifolds with a short blast of air. Since, by virtue of the necessary spacing between the slots 30 in the selector plate 28, each count will be spaced from its preceding and successive counts by at least four empty manifolds, the counts are released in the article discharge zone at spaced intervals of time.

The accumulator means according to the preferred embodiment includes an endless conveyor belt 50 onto which each count of articles initially falls. The conveyor belt 50 carries the counts to a receptacle 51, which collects each count of articles and then rotates 180° to discharge a prior count and receive a subsequent count. In the preferred embodiment, the electric motor 12 drives the conveyor belt 50 and the intermittently operated receptacle 51 by a drive means (not shown) so that the conveyor belt 50 and the receptacle 51 operate in a substantially fixed timed relation to the rotation of the drum. In the preferred embodiment, the receptacle 51 intermittently rotates through a half turn nine times during each complete rotation of the drum 11 to collect each of the nine counts of articles supplied during one rotation of the drum. If it is desired to accumulate a count having a greater number of articles than any one counter can transfer, the rotation of the receptacle 51 can be delayed until two or more counts have accumulated therein. If desired, the rotation of the receptacle 51 could be actuated by the absence of articles on the conveyor 50 (signifying the space between counts) by a photoelectric sensing means or the like, rather than the drive means described above.

The article transfer assembly 10 is further provided with a means to prevent an erroneous count that would result from any two or more axially adjacent nozzles picking up the same article. This means includes a plurality of annular separator plates 53 placed between axially adjacent nozzles. These separator plates 53 are arranged so that the effective distance between axially adjacent nozzles is made greater than the greatest dimension of the article that is to be transferred. This permits the nozzles to be placed axially closer together along the manifold to increase the capacity of the machine.

Although a preferred embodiment of the invention has been described in detail, the invention is not restricted to the slavish imitation thereof. Obviously, devices may be provided which change, add, or eliminate certain details without departing from the scope of the invention.

What I claim is:

1. An article transfer assembly comprising an article counter means, said article counter means including a plurality of article pickup means each operable to receive a predetermined number of articles when actuated and to reject said predetermined number of articles when deactuated, a transfer means operable to move said article counter means between an article-receiving zone and an article discharge zone, a means for discharging excess articles between said article-receiving zone and said article discharge zone, and an actuator means to selectively actuate one of a plurality of combinations of said article pickup means at said article-receiving zone and to deactuate the selected combination of article pickup means at said article discharge zone so that said article transfer assembly transfers a preselected number of articles from said article-receiving zone to said article discharge zone.

2. An article transfer assembly as defined in claim 1, wherein the increment between successive numbers in the range of articles that can be transferred is numerically less than the number of articles receivable by any one of said article pickup means.

3. An article transfer assembly as defined in claim 1 wherein each of said article pickup means includes a predetermined number of vacuum fingers each operable to receive one of said articles when supplied with a vacuum at said article-receiving zone, said means for discharging excess articles includes means for supplying a blast of air adjacent each of said vacuum fingers, and said actuator means is a valve means operable to supply said vacuum to said selected combination of article pickup means at said article-receiving zone and to release said vacuum on said selected combination at said article discharge zone.

4. An article transfer assembly as defined in claim 1 wherein said transfer means is a drum rotatably disposed about a substantially horizontal axis, said article counter means is rotatable with said drum, and said drum is partially filled with said articles.

5. An article transfer assembly comprising a drum rotatably disposed about a substantially horizontal axis, an article counter means rotatable with said drum between an article-receiving zone and an article discharge zone, said article counter means being operable to transfer preselected counts of articles from said receiving zone to said discharge zone and including a plurality of axially extending vacuum manifolds and a plurality of axially adjacent vacuum fingers associated with each of said manifolds, each of said vacuum fingers being operable to pick up one of said articles when its associated manifold is actuated with a vacuum at said article-receiving zone, valve means operable to selectively actuate one of a plurality of combinations of manifolds of said counter means at said article-receiving zone and to deactuate all of said actuated manifolds at said discharge zone to discharge said preselected count of articles, and conveyor means extending into said drum operable to carry said counts discharged at said discharge zone to a receptacle outside of said drum.

6. An article transfer assembly as defined in claim 5 wherein another article counter means is provided, and said article counter means are substantially identical and are radially spaced about said drum.

7. An article transfer assembly as defined in claim 5 wherein separator plates are provided between axially adjacent vacuum fingers, and the axial distance between axially adjacent vacuum fingers is less than the greatest length of one of said articles.

8. An article transfer assembly as defined in claim 5 wherein the number of vacuum fingers associated with one of said vacuum manifolds is less than the number of vacuum fingers associated with another of said vacuum manifolds.

9. A method of counting articles comprising partially filling a drum with said articles, rotating said drum about a substantially horizontal axis, picking up a preselected number of said articles in the lower portion of said drum by a vacuum means, said vacuum means including a plurality of vacuum fingers selectively supplied with vacuum in said lower portion of said drum, removing excess articles by supplying a blast of air adjacent said vacuum fingers, discharging said preselected number of articles in the upper portion of said drum by releasing said vacuum, catching said discharged preselected number of articles on a conveyor means, and carrying said discharged preselected number of articles outside of said drum.

10. An article transfer assembly comprising a drum rotatably disposed about a substantially horizontal axis, an article counter means rotatable with said drum between an article-receiving zone and an article discharge zone, said article counter means being operable to transfer preselected counts of articles from said receiving zone to said discharge zone and including a plurality of vacuum fingers, each of said vacuum fingers being operable to pick up one of said articles when it is actuated with a vacuum at said article-receiving zone, valve means operable to actuate at least some of said vacuum fingers at said article-receiving zone and to deactuate all of said actuated vacuum fingers at said discharge zone to discharge said preselected count of articles, conveyor means extending into said drum operable to carry said counts discharged at said discharge zone to a receptacle outside of said drum, and passage means extending through said drum adjacent each of said vacuum fingers for supplying an air blast adjacent each of said vacuum fingers for removing excess articles.

11. An article transfer assembly comprising a drum rotatably disposed about a substantially horizontal axis, an article counter means rotatable with said drum between an article-receiving zone and an article discharge zone, said article counter means being operable to transfer preselected counts of articles from said receiving zone to said discharge zone and including a plurality of axially extending vacuum manifolds and a plurality of axially adjacent vacuum fingers associated with each of said manifolds, each of said vacuum fingers being operable to pick up one of said articles when its associated manifold is actuated with a vacuum at said article-receiving zone, and valve means operable to selectively actuate one of a plurality of combinations of manifolds of said counter means at said article-receiving zone and to deactuate all of said actuated manifolds at said discharge zone to discharge said preselected count of articles.